UNITED STATES PATENT OFFICE.

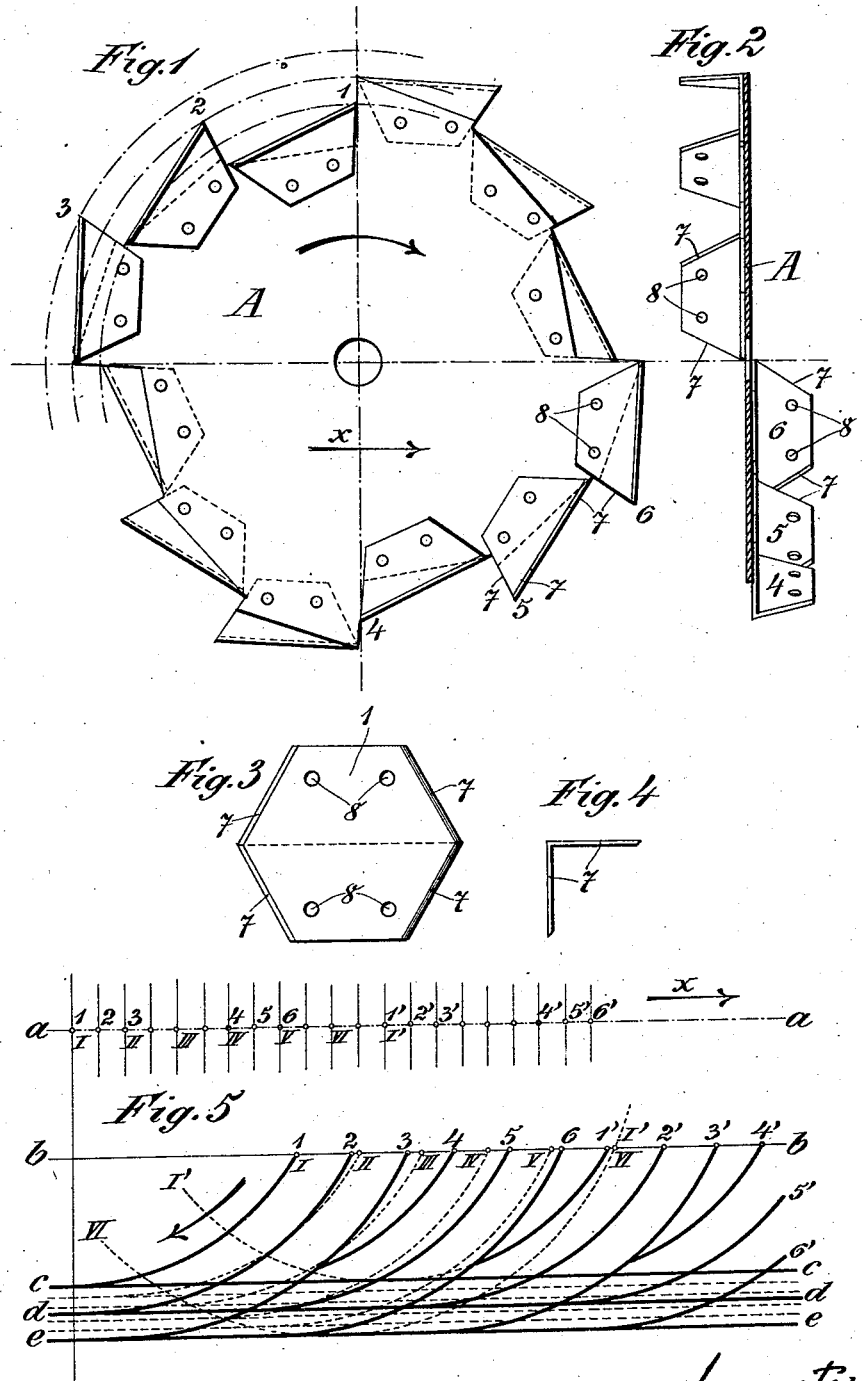

CHARLES KÖSZEGI, OF BUDAPEST, HUNGARY.

CULTIVATOR FOR TREATING THE SOIL.

1,414,364.   Specification of Letters Patent.   Patented May 2, 1922.

Application filed November 23, 1920. Serial No. 425,940.

*To all whom it may concern:*

Be it known that I, CHARLES KÖSZEGI, a subject of the Kingdom of Hungary, and residing at 64 Jozsef körut, Budapest VIII, Hungary, have invented certain new and useful Improvements in Cultivators for Treating the Soil, of which the following is a full, clear, and exact specification.

In previous constructions of cultivators for treating the soil consisting of hoe-like implements mounted on both sides of a disc or on spokes, the implements all work at the same depth and fail for that reason to comminute the soil to the required extent and to break up the manure and the roots of weeds in the soil so that the weeds are always able to grow afresh. The insufficiently comminuted soil or manure does not disintegrate to the desired extent and therefore the fertility of the soil is diminished. These drawbacks can only be overcome by causing the implements which succeed one another in the direction of rotation to operate at different depths so that the soil is cut into superposed layers at different depths and the manure and roots are completely comminuted.

The present invention relates to a cultivator of the type comprising hoe-like implements mounted on both sides of a disc or on spokes in which the points of the implements or hoes are not disposed, as heretofore, in a circle but are arranged in a spiral line so that the successive hoes cut deeper, i. e., each succeeding hoe penetrates further into the soil than the preceding one.

In certain well-known cultivating machines pins or teeth are uniformly distributed over the periphery of drums of spiral shape in cross section, which pins penetrate the earth to different depths. Apart, however, from the circumstance that pins or teeth do not work up and comminute the soil to the necessary extent or cut up the manure and the roots, these cultivating machines suffer from the drawback that with uniform forward travel of the machine, after the first rotation, the successive teeth located nearest the axis of rotation always enter the furrows of the preceding teeth furthest from the axis and therefore operate idly. This drawback would also be experienced with the construction forming the subject of the present invention, if the hoe-like implements were distributed uniformly around the circumference in the usual manner.

For this reason, according to my invention, the hoes are arranged not only in spirals but are also disposed in one or more groups, the several hoes of each group being arranged without an interval immediately one behind the other, whereas between the last hoe of each group and the first hoe of the following group there is left such an interval that during the forward movement of the cultivator the machine travels so far that the first following hoe does not enter into the furrow of the preceding hoe but penetrates fresh soil so that there is no idle operation of the hoes.

In order to increase the durability of the hoes which are subjected to great wear, my invention moreover contemplates such a construction of the hoes that each hoe can be employed say four times by a simple adjustment before it requires to be sharpened or replaced, whereby a great economy of time and material is effected. To this end, according to my invention, the hoes are formed of metal plates which are bent at right angles forming symmetrical portions. These plates are either of polygonal, square, rectangular or circular form but preferably of regular hexagonal form and they are overturned at right angles along a diagonal with their cutting edges at the edges adjacent this diagonal. The hoes are each secured by one wing to the face of the disc or spoke. On both wings of each hoe there are therefore formed apertures for the reception of fastening screws so arranged that the hoes can be used three more times after wear of one cutting edge until all the cutting edges are worn.

In the accompanying drawings illustrating the invention Fig. 1 is a side elevation and Fig. 2 a vertical section of a cultivator equipped with hoes according to my invention. Fig. 3 shows a hexagonal plate subsequently bent to form a hoe and provided with four cutting edges; Fig. 4 is a front view of the hoe made from such a plate. Fig. 5 shows in full lines the working diagram of my improved cultivator and in dotted lines the working diagram of a cultivator with uniformly distributed implements.

According to Figs. 1 and 2, A denotes a disc equipped with hoes secured alternately on one and the other side of the disc, and each made as indicated in Figs. 3 and 4 of a hexagonal steel plate bent at right angles as shown in Fig. 4. The hoes have four diagonal cutting edges. In both wings of the hoe holes 8 are formed symmetrically in relation to the diagonal edges and serving for the reception of the fastening screws, so that the hoes can be secured by either wing to either side of the disc A, as indicated in Fig. 1, in which way the four cutting edges of each hoe can be successively used.

These hoes are in the construction shown arranged in two groups on each side of the disc A. 1, 2, and 3 denote the hoes of the one group and 4, 5 and 6 denote the hoes of the other group the same side of the disc. The hoes of each group are provided with working points disposed in a spiral line so that each of the successively acting hoes of each group works more deeply than the preceding one and the soil is cut into as many superposed layers as there are hoes in a group. Each group of hoes occupies one quarter of the circumference of the disc A so that each group is followed by an empty space of the same length. While there are no hoes on one side of the disc in engagement with the soil the cultivator travels so far forwards in the direction of the arrow —x— (Fig. 1) that the first low set hoe of the second group of hoes on the same side does not enter the furrow of the last high-set hoe of the first group but cuts a fresh furrow. This is indicated diagrammatically in Fig. 5, where —a— —a— denotes the path of movement of the axis of the cultivator, while —b— —b— denotes the surface of the soil; the lines —c— —c— —d— —d— and —e— —e— indicates the travel of the several hoes. On the line —a— —a— are indicated the positions of the axis of the cultivator at the moment when the hoes 1, 2, 3 and 4, 5, 6 penetrate during one rotation while on the line —b— —b— the points of penetration of these hoes in the soil are indicated at 1, 2, 3, 4, 5 and 6 or for the next rotation at 1′, 2′, 3′, 4′, 5′ and 6′. The full curved lines represent the paths of the hoe points in the soil. I, II, III, IV, V and VI or I′ represent the positions of the axis of the cultivator or the points of penetration of the hoes, when the hoes are uniformly distributed along the periphery of the disc, the paths of the hoes being indicated by dotted lines. In the latter case VI, VI indicates the path of the last hoe which works at the greatest depth and 1′, 1′ denotes the path of the first hoe making the shallowest furrow on the next rotation. It will be seen from the diagram that in this case the path of the hoe I coincides with the furrow VI, VI of the previous hoe VI so that the first hoe does no work on the second and following rotations. In the other case, however, i. e. with the arrangement of the hoes according to my invention, the cultivator moves forward between the point of penetration of the last high set hoe of one group and the first low set hoe of the next group on the same side to such an extent that the low set hoe does not enter the furrow of the high set hoe of the preceding groups, but cuts a fresh furrow. Idle operation of any of the hoes is therefore impossible.

It will be evident that the groups of hoes on the one side of the disc are opposite the unoccupied portions on the other side of the disc as clearly shown in Figs. 1 and 2, so that the groups of hoes on either side do not work simultaneously but operate alternately.

I claim as my invention:

1. In a cultivator, the combination with a rotatable disc, of a plurality of exchangeable hoes mounted along the outer edge of the said disc at various distances from the axis of rotation of the said disc, the said hoes being mounted on either side of the said disc in alternating groups, the hoes in each group successively increasing in distance from the axis of the said disc in the direction of its rotation, the groups of hoes on the same side of the disc being separated by an inoperative portion corresponding to the length of one group.

2. In a cultivator as specified in claim 1, a hoe comprising a hexagonal member bent at right angles to form symmetrical hoe portions each portion having two cutting edges and symmetrically placed hoes for the reception of fastening means for removably attaching the hoe to the disc.

In testimony whereof I have signed my name to this specification.

CHARLES KÖSZEGI.